US008472409B2

(12) United States Patent
Sun et al.

(10) Patent No.: US 8,472,409 B2
(45) Date of Patent: Jun. 25, 2013

(54) DISTRIBUTED ANTENNA SYSTEM AND ITS DATA TRANSMISSION METHOD AND CENTRAL CONTROLLER

(75) Inventors: Shaohui Sun, Beijing (CN); Yunzhe Hou, Beijing (CN); Yingmin Wang, Beijing (CN); Yongbin Xie, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 261 days.

(21) Appl. No.: 12/999,210

(22) PCT Filed: Jun. 18, 2009

(86) PCT No.: PCT/CN2009/000668
§ 371 (c)(1),
(2), (4) Date: Feb. 2, 2011

(87) PCT Pub. No.: WO2009/152695
PCT Pub. Date: Dec. 23, 2009

(65) Prior Publication Data
US 2011/0299573 A1 Dec. 8, 2011

(30) Foreign Application Priority Data

Jun. 20, 2008 (CN) .......................... 2008 1 0115310

(51) Int. Cl.
*H04W 4/00* (2009.01)
(52) U.S. Cl.
USPC .......... 370/334; 370/328; 370/329; 370/330; 370/332; 455/561; 455/562.1

(58) Field of Classification Search
None
See application file for complete search history.

(56) References Cited

U.S. PATENT DOCUMENTS

| | | | |
|---|---|---|---|
| 7,751,843 B2 * | 7/2010 | Butala | 455/522 |
| 2004/0179627 A1 * | 9/2004 | Ketchum et al. | 375/267 |
| 2006/0276227 A1 * | 12/2006 | Dravida | 455/562.1 |
| 2009/0092073 A1 * | 4/2009 | Doppler et al. | 370/315 |
| 2009/0207822 A1 * | 8/2009 | Kim et al. | 370/338 |
| 2011/0003606 A1 * | 1/2011 | Forenza et al. | 455/501 |
| 2012/0039320 A1 * | 2/2012 | Lemson et al. | 370/338 |

FOREIGN PATENT DOCUMENTS

| | | |
|---|---|---|
| CN | 1 499 867 | 5/2004 |
| CN | 101 147 333 | 3/2008 |
| WO | 2007/142623 | 12/2007 |

* cited by examiner

*Primary Examiner* — Donald Mills
(74) *Attorney, Agent, or Firm* — Fay Kaplun & Marcin, LLP

(57) ABSTRACT

A data transmission method and central controller for a distributed antenna system and a distributed antenna system. The system includes a central controller and multiple wireless transceiver units. The method includes that wireless transceiver units measure the power of the pilot reference signals received from user terminals and forward this power rate to a central controller; the central controller selects a set of wireless transceiver units for transmitting data to the terminal according to the pilot reference signal power rates of the terminals forwarded by the multiple wireless transceiver units; the central controller performs data processing according to said set of wireless transceiver units; the central controller distributes the processed data to the wireless transceiver units in said set of wireless transceiver units, and the wireless transceiver units in said set perform the downlink data transmission.

16 Claims, 4 Drawing Sheets

US 8,472,409 B2

DISTRIBUTED ANTENNA SYSTEM AND ITS DATA TRANSMISSION METHOD AND CENTRAL CONTROLLER

CROSS REFERENCE TO RELATED APPLICATIONS

The present application is a US National Stage of International Application No. PCT/CN2009/000668, filed 18 Jun. 2009, designating the United States, and claiming priority to Chinese Patent Application No. 200810115310.2 filed 20 Jun. 2008.

FIELD OF THE INVENTION

The present invention relates to the field of communications and particularly to a distributed antenna system and a data transmission method thereof and a central controller.

BACKGROUND OF THE INVENTION

The International Telecommunication Union (ITU) is very demanding for the performance of the next generation mobile communication system of International Mobile Telecommunications-Advanced (IMT-Advanced), for example, regarding the maximum system transmission bandwidth up to 100 MHz and peak rates of uplink and downlink data transmission up to 500 Mbps/Hz and 1 Gbps/Hz, and also very demanding for an average spectrum efficiency and an edge spectrum efficiency of the system.

In order to accommodate the IMT-Advanced system, the $3^{rd}$ Generation Partner Project (3GPP) has proposed in its next generation mobile cellular communication system of Long Term Evolution (LET)-Advanced the use of a technology of distributed antennas to improve the performance of the system. The technology of distributed antennas refers to that antennas are distributed uniformly in a geographical area and all of the antennas are connected with a central controller through transmission lines, e.g., optical fibers, etc., so that the distance between each pair of distributed antennas is generally far above ten times the wavelength of a carrier. The central controller controls an antenna transmitting a signal to a user equipment at a time and receives a signal originated from a user equipment. FIG. 1 illustrates a scenario of downlink transmitting data at a moment of time T. At the moment of time T, the central controller selects three distributed antennas for transmission of data from a base station to a user equipment The technology of distributed antennas is considered in the 3GPP LTE-Advanced as a rather promising multiple antenna technology to improve the throughout and spectrum utilization factor of a dense cell system and has become a hot area of research in the LTE-Advanced. Distributed antennas can improve the capacity and cell edge transmission efficiency of a system, avoid inter-cell interference and improve the overall performance of the system. In an existing communication system, however, there has been a lack of an established specific solution to a design of distributed antennas.

SUMMARY OF THE INVENTION

An embodiment of the invention provides a data transmission method for a distributed antenna system to enforce a solution of distributed antennas in a communication system and improve the performance of the communication system. The system includes a central controller and a plurality of radio transceiver units, the data transmission method includes:

measuring, by the radio transceiver units, power information of a received user equipment pilot reference signal; and transmitting, by the radio transceiver, the power information to the central controller;

selecting, by the central controller, a set of radio transceiver units for transmission of data to a user equipment according to the power information of the user equipment pilot reference signal transmitted from the radio transceiver units;

processing, by the central controller, the data according to the set of radio transceiver units;

distributing, by the central controller, the processed data to the radio transceiver units in the set of radio transceiver units; and performing, by the radio transceiver units in the set of radio transceiver units, downlink transmission of the data.

An embodiment of the invention further provides a central controller for a distributed antenna system to enforce a solution of distributed antennas in a communication system and improve the performance of the communication system, the central controller includes:

a reception module, configured to receive power information of a user equipment pilot reference signal transmitted from a plurality of radio transceiver units;

a selection module, configured to select a set of radio transceiver units for transmission of data to a user equipment according to the received power information of the user equipment pilot reference signal transmitted from the radio transceiver units;

a data processing module, configured to process the data according to the set of radio transceiver units; and a transmission module, configured to distribute the processed data to the radio transceiver units in the set of radio transceiver units.

An embodiment of the invention further provides a distributed antenna system to enforce a solution of distributed antennas in a communication system and improve the performance of the communication system, the system includes:

a plurality of radio transceiver units, configured to measure power information of a received user equipment pilot reference signal, to transmit the power information and to perform downlink transmission of data; and a central controller, configured to select a set of radio transceiver units for transmission of the data to a user equipment according to the power information of the user equipment pilot reference signal transmitted from the radio transceiver units, to process the data according to the set of radio transceiver units and to distribute the processed data to the radio transceiver units in the set of radio transceiver units.

In embodiments of the invention, radio transceiver units measure power information of a received user equipment pilot reference signal, and transmit the power information to a central controller, the central controller selects a set of radio transceiver units for transmission of data to a user equipment according to the power information of the user equipment pilot reference signal transmitted from the radio transceiver units, processes the data according to the set of radio transceiver units and distributes the processed data to the radio transceiver units in the set of radio transceiver units, and the radio transceiver units in the set of radio transceiver units perform downlink transmission of the data, thereby enforcing a solution of distributed antennas in a communication system and improve the performance of the communication system.

DETAILED DESCRIPTION OF THE EMBODIMENTS

Embodiments of the invention are detailed hereinafter with reference to the drawings.

Figure 1:
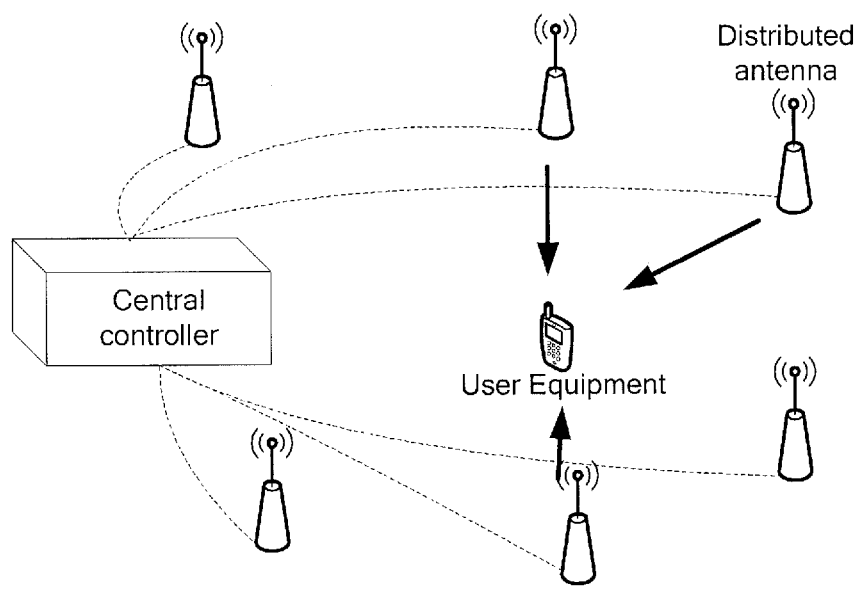
FIG. 1 illustrates a schematic diagram of implementing distributed antennas in the prior art.
Figure 2:
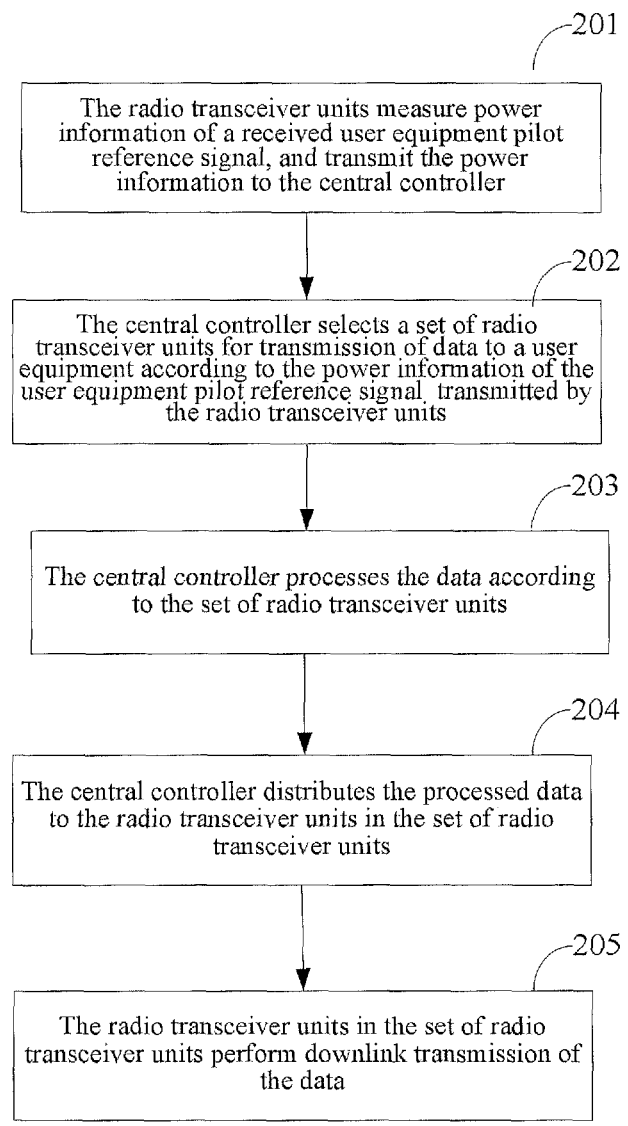
FIG. 2 illustrates a flow chart of a data transmission process for distributed antennas according to an embodiment of the invention.

A distributed antenna system according to an embodiment of the invention includes a central controller and a plurality of radio transceiver units. FIG. 2 illustrates a flow chart of a data transmission process for the distributed antenna system, particularly, the data transmission process comprising the following operations 201-205.

Operation 201. The radio transceiver units measure power information of a received user equipment pilot reference signal, and transmit the power information to the central controller.

Operation 202. The central controller selects a set of radio transceiver units for transmission of data to a user equipment according to the power information of the user equipment pilot reference signal transmitted from the radio transceiver units.

Operation 203. The central controller processes the data according to the set of radio transceiver units.

Operation 204. The central controller distributes the processed data to the radio transceiver units in the set of radio transceiver units.

Operation 205. The radio transceiver units in the set of radio transceiver units perform downlink transmission of the data.

Figure 3:
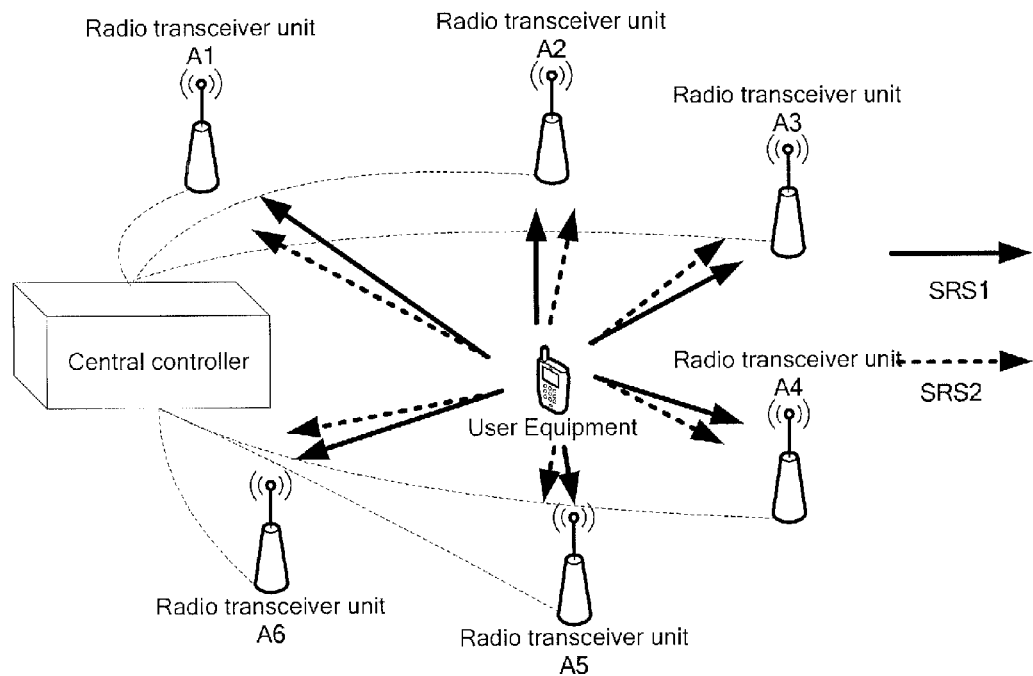
FIG. 3 illustrates a schematic diagram of implementing distributed antennas according to an embodiment of the invention.

Each of the radio transceiver units may include at least one antenna and may transmit or receive one or more data streams, and in an implementation, each of the radio transceiver units is configured to measure power information of a received user equipment pilot reference signal. A user equipment may transmit a pilot reference signal at a prescribed moment of time and in a prescribed frequency band dependent upon a configuration of a network, and the pilot reference signal may be referred to as a Sounding Reference Symbol or simply SRS. There may be multiple SRSs represented as SRS=$\{SRS_1, SRS_2, \ldots, SRS_i, \ldots, SRS_m\}$ indicating a total number, m, of different SRSs, each of which is consisted of pilot reference signals transmitted over one or more antennas. As illustrated in FIG. 3, the user equipment transmits two different SRSs represented as SRS=$\{SRS_1, SRS_2\}$, where a solid line represents the pilot reference signal $SRS_1$ and a dashed line represents the $SRS_2$.

A user equipment may report power information of a pilot reference signal transmitted therefrom to an antenna in various ways, for example, report the absolute value of the power, the power headroom report, etc. In an implementation, the power of the user equipment pilot reference signal may alternatively be calculated from data transmission power reported from the user equipment and the difference between the data transmission power and the power of the pilot reference signal.

A central controller may select a set of radio transceiver units for transmission of data to a user equipment according to the power information of the user equipment pilot reference signal transmitted from the radio transceiver units. As illustrated in FIG. 3, the central controller selects a set of radio transceiver units represented as S=$\{A_2, A_3, A_5\}$ for downlink transmission of the data to the user equipment, where S represents a subset of all the distributed antennas in an area covered by a base station on the network side.

In an embodiment, the central controller may determine, from the power information of the user equipment pilot reference signal transmitted from the radio transceiver units, channel status information in downlink transmission of the data from the radio transceiver units in the set of radio transceiver units and process the data according to the channel status information. In an implementation, the central controller may determine channel status information of uplink channels from the power information of user equipment pilot reference signal transmitted from the radio transceiver units and determine, from the channel status information of the uplink channels, channel status information of downlink channels in downlink transmission of the data from the radio transceiver units in the set of radio transceiver units, and further process the data according to the channel status information of the downlink channels.

The distributed antenna system according to an embodiment of the invention is applicable to a Time Division Duplex (TDD) system or a Frequency Division Duplex (FDD) system. Taking an application in the TDD system as an example, the central controller may determine the channel status information of the downlink channels from the channel status information of the uplink channels in view of the symmetry of the uplink and downlink channels. The channel status information of the downlink channels refers to status information of channels between each of downlink transmission antennas and a corresponding reception antenna of the user equipment, and includes information on the amplitude, phase, etc., of a signal. Due to the symmetry of the TDD uplink and downlink channels, the information on the phase of a signal transmitted from each uplink transmission antenna of the user equipment to a reception antenna of the base station is the same as that of a signal transmitted from the antenna of the base station to a reception antenna of the user equipment, thus the channel status information of the downlink channels can be determined from the channel status information of the uplink channels in view of the symmetry.

The channel status information may be a matrix of channel impulse responses. The central controller may determine a matrix of channel impulse responses of the downlink channels from a matrix of channel impulse responses of the uplink channels, i.e., a matrix of channel impulse responses of pilot reference signals transmitted from the user equipment up to the set of radio transceiver units S (a matrix H hereinafter). For example, the central controller may transpose the matrix H to convert channel phase status information of a reception matrix into channel phase status information of a transmission matrix.

In an embodiment, the central controller may further determine from the channel status information the number of data streams for transmission to the user equipment and subsequently process the data according to the number of data streams and the channel status information.

The central controller may determine from the matrix H the number, N, of data streams for transmission to the user equipment (equal to the number of parallel multiplexed data streams transmitted from the user equipment). Also as illustrated in FIG. 3, channel impulse responses of pilot reference signals transmitted from the user equipment to the network side are represented as H={$h_2,h_3,h_5$}, where $h_i$ represents a channel impulse response of a pilot reference signal up to a radio transceiver unit $A_i$. In the case the user equipment transmits SRS1 and SRS2 to the network side, then $h_i$=[$h_{i,1}$, $h_{i,2}$], where, $h_{i,1}$ and $h_{i,2}$ represent channel impulse responses of SRS1 and SRS2 up to the radio transceiver unit $A_i$ respectively. The central controller may determine from the matrix H the use of two parallel data streams for transmission of the data to the user equipment, and in a specific implementation, determine the number of data streams for transmission to the user equipment from eigen-values resulting from decomposition of the matrix H.

In an embodiment, processing, by the central controller, the data according to the channel status information may comprises: decomposing the matrix of channel impulse responses to derive vectors of shaping weights for each radio transceiver units in the set of radio transceiver units and subsequently performing a shaping weight process on the data for transmission from each radio transceiver units in the set of radio transceiver units according to the derived vectors of shaping weights.

Specifically, the matrix H is decomposed through for example the Singular Value Decomposition (SVD) or the Eigen-Value Decomposition (EVD), to derive vectors of shaping weights, i.e., $W_i$={$w_{i,1}, w_{i,2}, \ldots, w_{i,j}, \ldots, w_{i,N}$} for each radio transceiver units in the set of radio transceiver units S transmitting a number, N, of data streams to the user equipment, where $w_{i,j}$ represents a shaping weight of the $j^{th}$ data stream of the $i^{th}$ radio transceiver unit.

The data streams for transmission may be preprocessed according to the vectors of shaping weights by multiplying the data streams for transmission with the vectors of shaping weights, so that the data streams for transmission can be better configured to the status of the channel and therefore the power of the downlink data can be more concentrated with less interference and a higher signal noise ratio, thus improving the capacity of the system.

In an implementation, the central controller may weight one or more streams of data respectively according to the weights for each stream of each radio transceiver unit and transmit the weighted data to the radio transceiver units in the set of radio transceiver units among which the data is shaped jointly. The same stream of data is processed according to different shaping weights for one or more units $A_i$ and then transmitted.

The central controller may further distinguish data transmitted from different units $A_i$, where different data may be transmitted from different units $A_i$ and one or more streams may be transmitted from one unit $A_i$. The central controller transmits data streams for transmission from different units $A_i$ to the corresponding radio transceiver units, and the radio transceiver units transmit different data respectively.

In an embodiment, control signaling may be further carried in the data for downlink transmission from the radio transceiver units in the set of radio transceiver units at the network side according to a Channel Quality Indicator (CQI) reported from the user equipment and a transmission channel condition, to indicate an OFDM resource in the time and frequency domains to be occupied for the data streams for transmission, and subsequently the user equipment may receive the downlink data over the OFDM resource in the time and frequency domains indicated in the controlling signaling. The control signaling may further indicate the number of data streams for transmission, and the user equipment may receive the data streams of this number.

In an embodiment, the control signaling may further include a modulation scheme and an encoding rate of the downlink data, and subsequently the user equipment may demodulate the received downlink data in the modulation scheme of the downlink data in the control signaling and decode the demodulated downlink data at the encoding rate of the downlink data in the control signaling.

In an embodiment, when the shaping weighted data streams are transmitted to the user equipment through the set of radio transceiver units S, dedicated pilots for the user equipment to decode the data may further be included in the OFDM resource block in the time and frequency domains occupied for the transmission of the data. The number of dedicated pilots is equal to the number of transmitted downlink data streams, and the dedicated pilots are processed prior to transmission according to the set of radio transceiver units. Specifically, the dedicated pilots may be processed according to the channel status information of the downlink channels, for example, according to the same shaping weights for the downlink data transmitted over the OFDM resource in the time and frequency domains. For example, a dedicated pilot $D_i$ corresponds to the shaping weight of the data stream i over the corresponding resource in the time and frequency domains. Subsequently, the user equipment may demodulate the received downlink data according to the received dedicated pilots.

Figure 4:
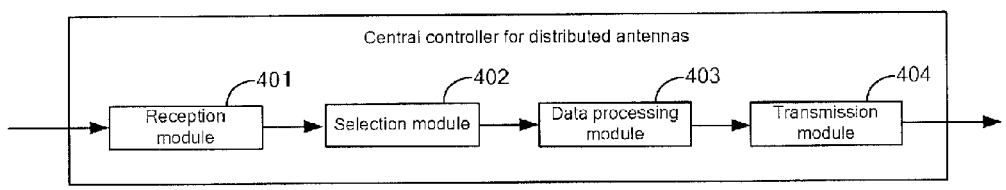
FIG. 4 illustrates a schematic structural diagram of a central controller of a distributed antenna system according to an embodiment of the invention.

Based upon a similar inventive concept, an embodiment of the invention further provides a central controller for a distributed antenna system. The central controller is structured as illustrated in FIG. 4 and includes:

a reception module 401, configured to receive power information of a user equipment pilot reference signal transmitted from a plurality of radio transceiver units each of which includes at least one antenna;

a selection module 402, configured to select a set of radio transceiver units for transmission of data to a user equipment according to the received power information of the user equipment pilot reference signal transmitted from the radio transceiver units;

a data processing module 403, configured to process the data according to the set of radio transceiver units; and a transmission module 404, configured to distribute the processed data to the radio transceiver units in the set of radio transceiver units.

Figure 5:
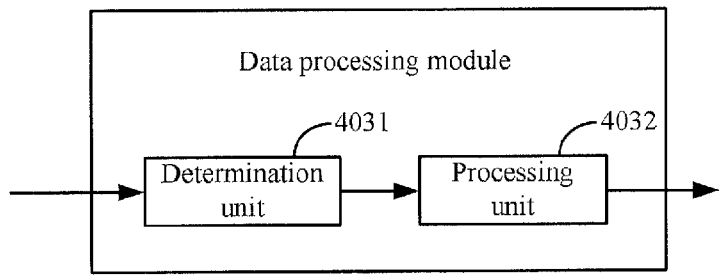
FIG. 5 illustrates a schematic structural diagram of a data processing module according to an embodiment of the invention.

As illustrated in FIG. 5, the data processing module 403 in an embodiment may include:

a determination unit 4031, configured to determine, from the power information of the user equipment pilot reference signal transmitted from the a plurality of radio transceiver units, channel status information in downlink transmission of the data from the radio transceiver units in the set of radio transceiver units; and a processing unit 4032, configured to process the data according to the channel status information.

Figure 6:
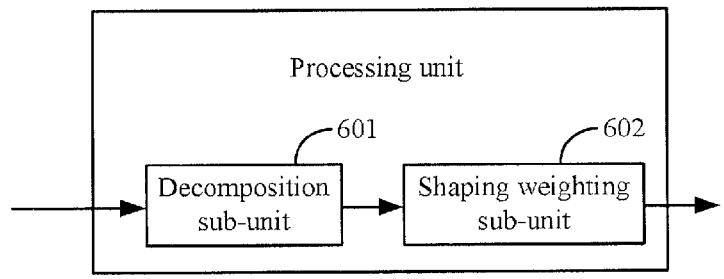
FIG. 6 illustrates a schematic structural diagram of a processing unit according to an embodiment of the invention.

In an embodiment, the channel status information includes a matrix of channel impulse responses, and as illustrated in FIG. 6, the processing unit 4032 may include:

a decomposition sub-unit 601, configured to decompose the matrix of channel impulse responses to derive vectors of shaping weights for each of the radio transceiver units in the set of radio transceiver units; and a shaping weight sub-unit 602, configured to perform a shaping weight process on the data for transmission from each of the radio transceiver units in the set of radio transceiver units according to the derived vectors of shaping weights.

In an embodiment, the determination unit 4031 may further be configured to determine the number of data streams for transmission to the user equipment from the channel status information, and then the processing unit 4032 may further be configured to process the data according to the number of data streams and the channel status information.

Figure 7:
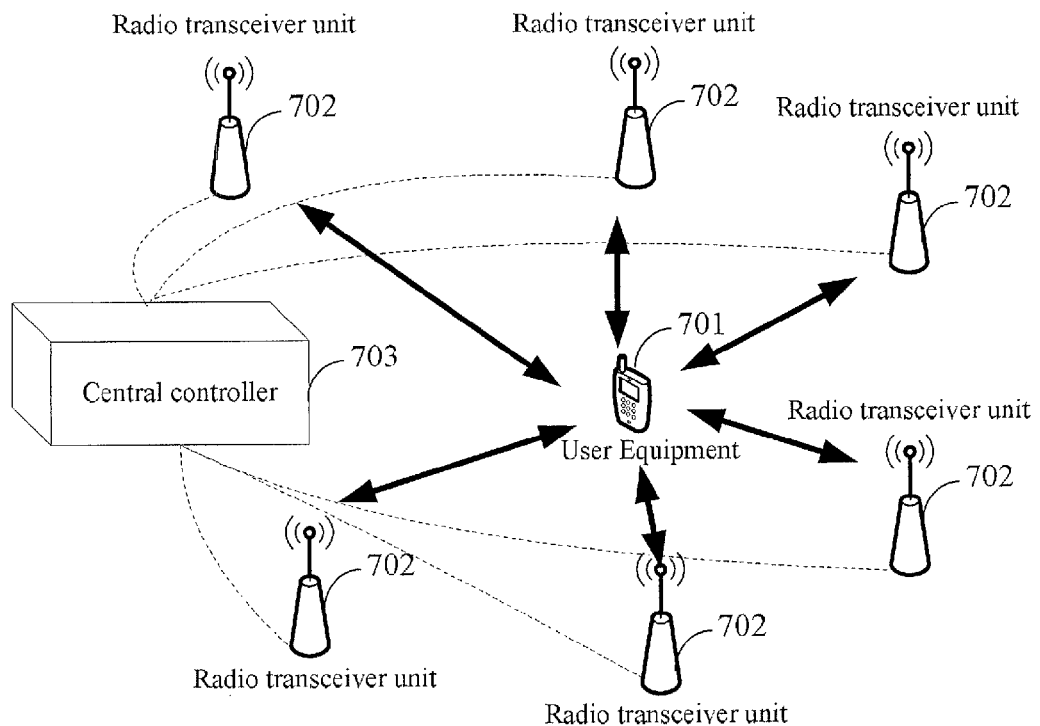
FIG. 7 illustrates a schematic structural diagram of a distributed antenna system according to an embodiment of the invention.

Based upon a similar inventive concept, an embodiment of the invention further provides a distributed antenna system. The system is structured as illustrated in FIG. 7 and includes:

a user equipment 701, configured to transmit and receive data;

multiple antenna transceiver units 702, configured to measure power information of a received user equipment pilot reference signal, to transmit the power information and to perform downlink transmission of data; and a central controller 703, configured to select a set of radio transceiver units for transmission of data to the user equipment according to the power information of the user equipment pilot reference signal transmitted from the radio transceiver units, to process the data according to the set of radio transceiver units and to distribute the processed data to the radio transceiver units in the set of radio transceiver units.

In an embodiment of the invention, radio transceiver units measure power information of a received user equipment pilot reference signal and transmit the power information to a central controller, the central controller selects a set of radio transceiver units for transmission of data to a user equipment according to the power information of the user equipment pilot reference signal transmitted from the radio transceiver units, processes the data according to the set of radio transceiver units and distributes the processed data to the radio transceiver units in the set of radio transceiver units, and the radio transceiver units in the set of radio transceiver units perform downlink transmission of the data, thereby enforcing a solution of distributed antennas in a communication system and improve the performance of the communication system.

Embodiments of the invention are applicable to a TDD system or an FDD system, and particularly for the TDD system, an applicable solution for processing of the data by the central controller according to the set of radio transceiver units is further proposed.

Evidently, those skilled in the art can make various modifications and variations to the invention without departing from the scope of the invention. Accordingly, the invention is also intended to encompass these modifications and variations thereto provided these modifications and variations come into the scope of the appended claims and their equivalences.

The invention claimed is:

1. A data transmission method for a distributed antenna system comprising a central controller and a plurality of radio transceiver units, wherein, the method comprises:

selecting, by the central controller, a set of radio transceiver units for transmission of data to a user equipment according to power information of a user equipment pilot reference signal transmitted by the radio transceiver units;

processing, by the central controller, the data according to the set of radio transceiver units; and distributing, by the central controller, the processed data to the radio transceiver units in the set of radio transceiver units; wherein, the processed data is downlink transmitted by the radio transceiver units in the set of radio transceiver units respectively;

wherein, processing by the central controller the data according to the set of radio transceiver units comprises:

determining, by the central controller, from the power information of the user equipment pilot reference signal transmitted from the radio transceiver units, channel status information in downlink transmission of the data from the radio transceiver units in the set of radio transceiver units; and processing, the central controller the data according to the channel status information; wherein, the channel status information comprises a matrix of channel impulse responses;

and wherein processing, by the central controller, the data according to the channel status information comprises:

decomposing, by the central controller, the matrix of channel impulse responses to derive vectors of beam weighting for each of the radio transceiver units in the set of radio transceiver units; and performing, by the central controller, a beam weighting process on the data for transmission from each of the radio transceiver units in the set of radio transceiver units according to the derived vectors of beam weighting for the radio transceiver unit.

2. The method of claim 1, wherein, the central controller further determines the number of data streams for transmission to the user equipment from the channel status information;

and wherein processing by the central controller the data according to the channel status information comprises:

processing, by the central controller, the data according to the number of data streams and the channel status information.

3. The method of claim 1, wherein, control signaling is comprised in the data downlink transmitted from the radio transceiver units in the set of radio transceiver units to indicate an Orthogonal Frequency Division Multiplexing, OFDM, resource in the time and frequency domains occupied for the downlink data; and wherein the method further comprises:

receiving, by the user equipment, the downlink data over the OFDM resource in the time and frequency domains indicated in the control signaling.

4. The method of claim 3, wherein, the control signaling further comprises a modulation scheme and an encoding rate of the downlink data; and wherein the method further comprises:

demodulating, by the user equipment, the received downlink data in the modulation scheme and decoding the demodulated downlink data at the encoding rate.

5. The method of claim 3, wherein, dedicated pilots are further comprised in the downlink data transmitted from the radio transceiver units in the set of radio transceiver units; and wherein the method further comprises:

demodulating, by the user equipment, the received downlink data according to the dedicated pilots.

6. The method of claim 5, wherein, the dedicated pilots are processed according to the set of radio transceiver units prior to transmission.

7. A central controller for a distributed antenna system, comprising:

a reception module, configured to receive power information of a user equipment pilot reference signal transmitted from a plurality of radio transceiver units;

a selection module, configured to select a set of radio transceiver units for transmission of data to a user equipment according to the received power information of the user equipment pilot reference signal transmitted from the radio transceiver units;
a data processing module, configured to process the data according to the set of radio transceiver units; and
a transmission module, configured to distribute the processed data to the radio transceiver units in the set of radio transceiver units;
wherein, the data processing module comprises:
a determination unit, configured to determine, from the power information of the user equipment pilot reference signal transmitted from a plurality of radio transceiver units, channel status information in downlink transmission of the data from the radio transceiver units in the set of radio transceiver units; and
a processing unit, configured to process the data according to the channel status information; wherein, the channel status information comprises a matrix of channel impulse responses;
and wherein the processing unit comprises:
a decomposition sub-unit, configured to decompose the matrix of channel impulse responses to derive vectors of beam weighting for each of the radio transceiver units in the set of radio transceiver units; and
a weighting sub-unit, configured to perforin a beam weighting process on the data for transmission from each of the radio transceiver units in the set of radio transceiver units according to the derived vectors of beam weighting for the radio transceiver unit.

8. The central controller of claim 7, wherein, the determination unit is further configured to determine the number of data streams for transmission to the user equipment from the channel status information; and
the processing unit is further configured to process the data according to the number of data streams and the channel status information.

9. A distributed antenna system, comprising:
a plurality of radio transceiver units, configured to measure power information of a received user equipment pilot reference signal, to transmit the power information and to perform downlink transmission of data; and
a central controller according to claim 7.

10. The method of claim 1, wherein, determining from the power information of the user equipment pilot reference signal transmitted from the radio transceiver units, channel status information in downlink transmission of the data from the radio transceiver units in the set of radio transceiver units comprises:
determining from the power information of the user equipment pilot reference signal transmitted from the radio transceiver units, channel status information in uplink transmission to the radio transceiver units in the set of radio transceiver units; and
determining from the channel status information in uplink transmission, the channel status information in downlink transmission of the data from the radio transceiver units in the set of radio transceiver units.

11. The method of claim 10, wherein, the system is a Time Division Duplex system,
and wherein determining from the channel status information in uplink transmission, the channel status information in downlink transmission of the data from the radio transceiver units in the set of radio transceiver units comprises:
determining from the channel status information in uplink transmission and symmetry of a uplink channel and a downlink channel, the channel status information in downlink transmission of the data from the radio transceiver units in the set of radio transceiver units.

12. The method of claim 2,
wherein further determining the number of data streams for transmission to the user equipment from the channel status information comprises:
determining the number of data streams for transmission to the user equipment from eigen-values resulting from decomposition of the matrix of channel impulse responses.

13. The method of claim 2,
wherein processing the data according to the number of data streams and the channel status information comprises:
decomposing the matrix of channel impulse responses to derive vectors of beam weighting for each of the radio transceiver units in the set of radio transceiver units; and
performing a beam weighting process on each of the data streams for transmission from each of the radio transceiver units in the set of radio transceiver units according to the derived vectors of beam weighting.

14. The method of claim 3, wherein, the control signaling further comprises a number of data streams for transmission to the user equipment; and wherein
The method further comprises:
receiving, by the user equipment, the data streams of this number.

15. The method of claim 6, wherein, the number of dedicated pilots is equal to the number of data streams transmitted to the user equipment.

16. The method of claim 15, wherein, processing the dedicated pilots according to the set of radio transceiver units comprises:
processing the dedicated pilots according to channel status information in downlink transmission of the data from the radio transceiver units in the set of radio transceiver units.

* * * * *